United States Patent [19]

Pyeong

[11] Patent Number: 5,625,419
[45] Date of Patent: Apr. 29, 1997

[54] VERTICAL FILTER CIRCUIT FOR PICTURE IN PICTURE DISPLAY DEVICE OF TELEVISION SYSTEM AND METHOD THEREFOR

[75] Inventor: Seong-Wook Pyeong, Suwon, Rep. of Korea

[73] Assignee: Samsung Electronics Co., Ltd., Kyungki-do, Rep. of Korea

[21] Appl. No.: 506,375

[22] Filed: Jul. 24, 1995

[30] Foreign Application Priority Data

Jul. 26, 1994 [KR] Rep. of Korea ............... 18113/1994

[51] Int. Cl.$^6$ ............................................. H04N 5/262
[52] U.S. Cl. ............................................. 348/568; 348/565
[58] Field of Search ............................................. 348/565–568, 348/704, 588; H04N 5/262

[56] References Cited

U.S. PATENT DOCUMENTS

| | | | |
|---|---|---|---|
| 4,665,439 | 5/1987 | Naimpally | 348/458 |
| 4,971,448 | 11/1990 | Van Zon | 348/567 |
| 5,111,297 | 5/1992 | Tsuji et al. | 348/565 |
| 5,459,528 | 10/1995 | Pettitt | 348/568 |

*Primary Examiner*—Glenton B. Burgess
*Attorney, Agent, or Firm*—Sughrue, Mion, Zinn, Macpeak & Seas

[57] ABSTRACT

A vertical filter circuit for a picture in picture (PIP) display device in a video system such as a television set is capable of vertically filtering image data to be received in accordance with a selected scan mode. The vertical filter circuit includes a control unit receiving a horizontal sync signal and generating a first control signal used in selecting an attenuation coefficient and generating a second control signal for controlling the number of horizontal lines to be compressed, an attenuating unit attenuating and outputting the received image data according to the attenuation coefficient selected using the first control signal, an adding unit connected to the attenuating unit, for adding and averaging the attenuated image data received from the attenuating unit and a line memory, the line memory being connected to the adding unit and storing the attenuated image data, and a switching unit connected the line memory, and having a first output terminal to output the stored image data, and having a second output terminal connected to the adding unit. The switching unit is switched responsive to the second control signal. The vertical filter attenuates the image data received during a horizontal line period with the attenuation coefficient determined by the first control signal, and compresses the image data averaged over a predetermined member of horizontal lines responsive to the second control signal. A vertical filtering method is also disclosed.

14 Claims, 3 Drawing Sheets

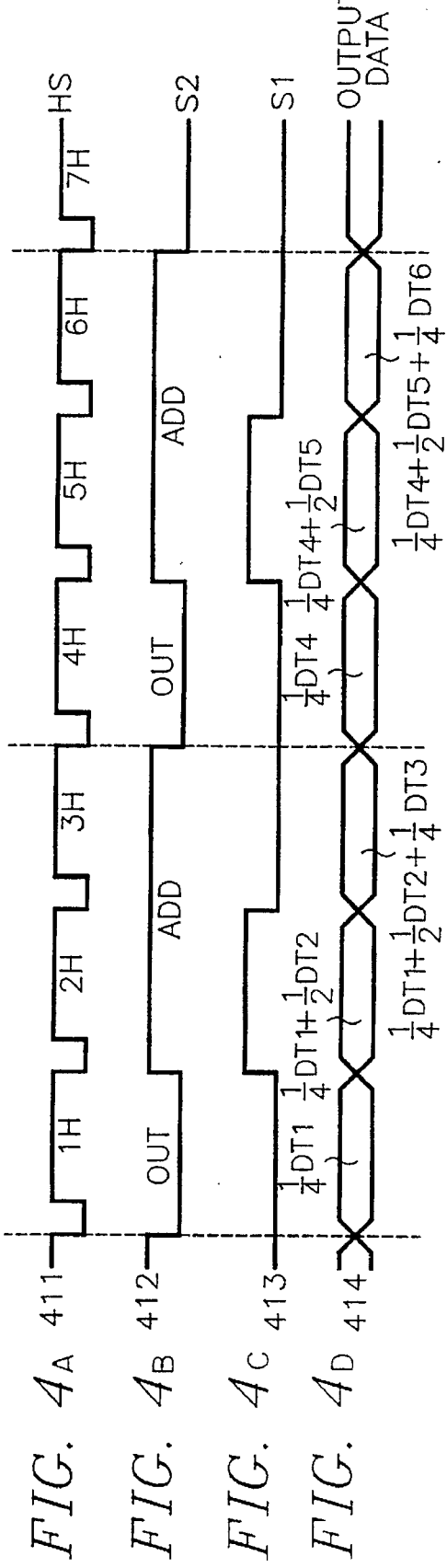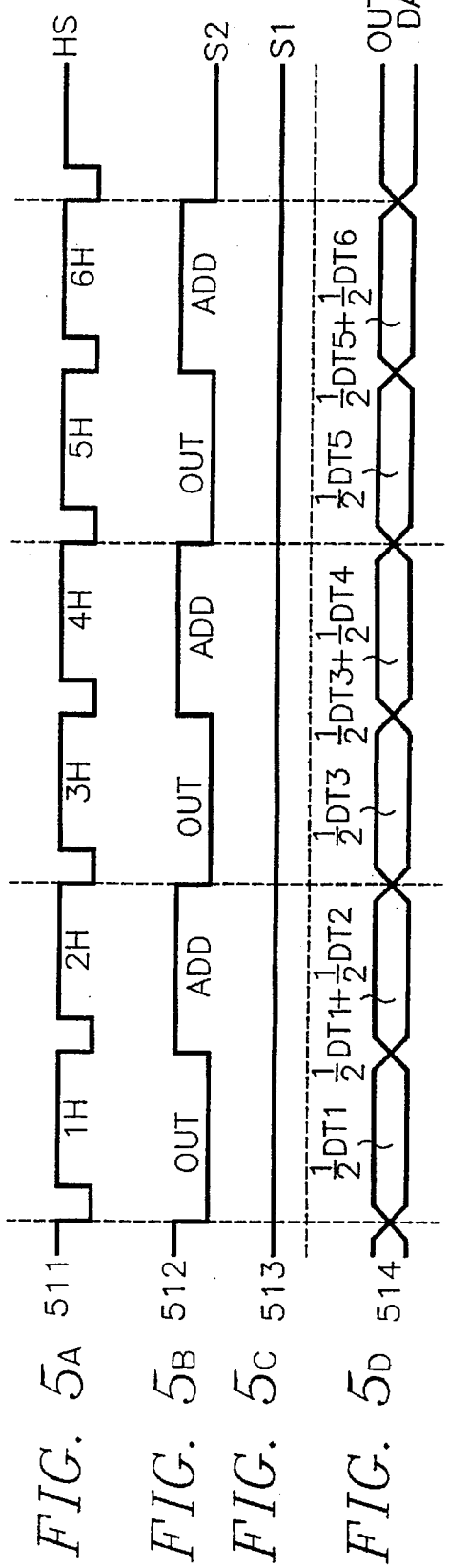

5,625,419

VERTICAL FILTER CIRCUIT FOR PICTURE IN PICTURE DISPLAY DEVICE OF TELEVISION SYSTEM AND METHOD THEREFOR

BACKGROUND OF THE INVENTION

1. Field of the Invention

The present invention relates to a vertical filter circuit for a picture in picture display device of a television system and more particularly to a circuit capable of vertically filtering image data to be received in accordance with a scan mode. A method for vertical filtering is also disclosed.

The instant application is based on Korean Patent Application No. 94-18113 (1994) which is incorporated herein by reference for all purposes.

2. Brief Discussion of Related Art

In many late model television sets, a picture in picture display (hereinafter, simply PIP) can simultaneously display both a main picture and a compressed image. In this case, the PIP display is embodied by a PIP exclusive-use integrated circuit, in which a vertical filter is used for compressing image data of a horizontal line.

Furthermore, when a television set achieves a certain, i.e., large, size, the picture may be rough and unpleasant to a user's eye due to enlargement of the scanning interval of the picture. To prevent this problem, a double scan method, in which the number of scanning lines is doubled, is generally applied to large-sized television sets. In this case, since the large-sized television set having a double scan mode is different from a television set having a normal scan mode in the number of scanning lines, a separate PIP exclusive-use integrated circuit has to be used therein.

SUMMARY OF THE INVENTION

The present invention was motivated by a desire to overcome the problems perceived in the prior art, particularly the proliferation of circuits needed for providing PIP functions in a television set.

An object of the present invention to provide a vertical filter circuit which averages image data of horizontal lines to be received in a PIP display device of a television set, thereby compressing the image data of respective horizontal lines.

Another object of the present invention is to provide a method for vertical filtering which averages image data of horizontal lines, thereby compressing the image data of to respective horizontal lines.

Still another object of the present invention is to provide a vertical filter circuit which averages image data of horizontal lines to be received in a PIP display device of a television set having a normal scan mode by an attenuation coefficient corresponding to the normal scan mode, thereby compressing the image data of respective horizontal lines.

Yet another object of the present invention is to provide a method for vertical filtering which averages image data of horizontal lines in a normal scan mode responsive to an attenuation coefficient corresponding to the normal scan mode, thereby compressing the image data of respective horizontal lines.

Another object of the present invention is to provide a vertical filter circuit which averages image data of horizontal lines received in a PIP display device of a television set having a double scan mode by an attenuation coefficient associated with the double scan mode, thereby compressing the image data of respective horizontal lines.

A still further object of the present invention is to provide a vertical filtering method which averages image data of horizontal lines in a double scan mode by an associated attenuation coefficient corresponding to the double scan mode, thereby compressing the image data of respective horizontal lines.

A further object of the present invention is to provide a vertical filter circuit which averages image data of horizontal lines received in a PIP display device of a television set in both normal and double scan modes of operation by respective attenuation coefficients associated with the designated scan mode, thereby compressing the image data of respective horizontal lines. According to one aspect of the present invention, a corresponding vertical filtering method is also provided.

These and other objects, features and advantages according to the present invention are provided by a vertical filter circuit. The vertical filter circuit includes a control unit which receives a horizontal sync signal and respectively generates a first control signal for selecting an attenuation coefficient by dividing the horizontal sync signal and a second control signal for compressing the number of horizontal lines, an attenuating unit which receives image data, and attenuates the received image data with the attenuation coefficient determined by the first control signal, an adding and averaging unit which is connected to said attenuating unit at a first input terminal thereof, and which adds the attenuated image data received at the first input terminal and a second input terminal thereof and averages the added image data, a line memory which is connected to an output terminal of the adding and averaging unit, and stores the added image data with a size of a horizontal line, a switching unit having an input terminal connected to an output terminal of the line memory, a first output terminal connected to the PIP circuit, and a second output terminal connected to the second input terminal of the adding and averaging unit, and being switched by the second control signal.

In the vertical filter circuit according to the present invention, the attenuation coefficient advantageously can be selected by the first control signal; image data received during a horizontal line period is attenuated by the selected attenuation coefficient. Then, responsive to the second control signal, the vertical filter compresses and averages image data of a predetermined number of horizontal lines and outputs the compressed image data.

BRIEF DESCRIPTION OF THE DRAWINGS

The present invention can best be understood from the detailed description which follows which reference of the attached drawings, in which like numbers indicate the same or similar elements, and in which:

FIGS. 4A–4D are waveform diagrams illustrating operations of each component of the vertical filter circuit in a normal scan mode according to the present invention; and FIGS. 5A–5D are waveform diagrams illustrating operations of each component of the vertical filter circuit in a double scan mode according to the present invention.

DETAILED DESCRIPTION OF THE PREFERRED EMBODIMENTS

In the following description, numerous specific details, such as a scan mode and an attenuation coefficient of each scan mode and so on, are set forth in order to provide a thorough understanding of the present invention. It will be understood by those skilled in the art that other embodiments of the present invention may be practiced without these specific details, or with alternative specific details.

The term "a first control signal" as used herein refers to a signal for selecting an attenuation value of an integer selecting unit 20. The terms "a first attenuation and a second attenuation" are used to describe an operation performed for attenuating image data to be received with the attenuation coefficient selected by the first control signal. Furthermore, the term "a second control signal" as used herein refers to a selection signal for enabling an output of a switching unit 50.

Figure 1:
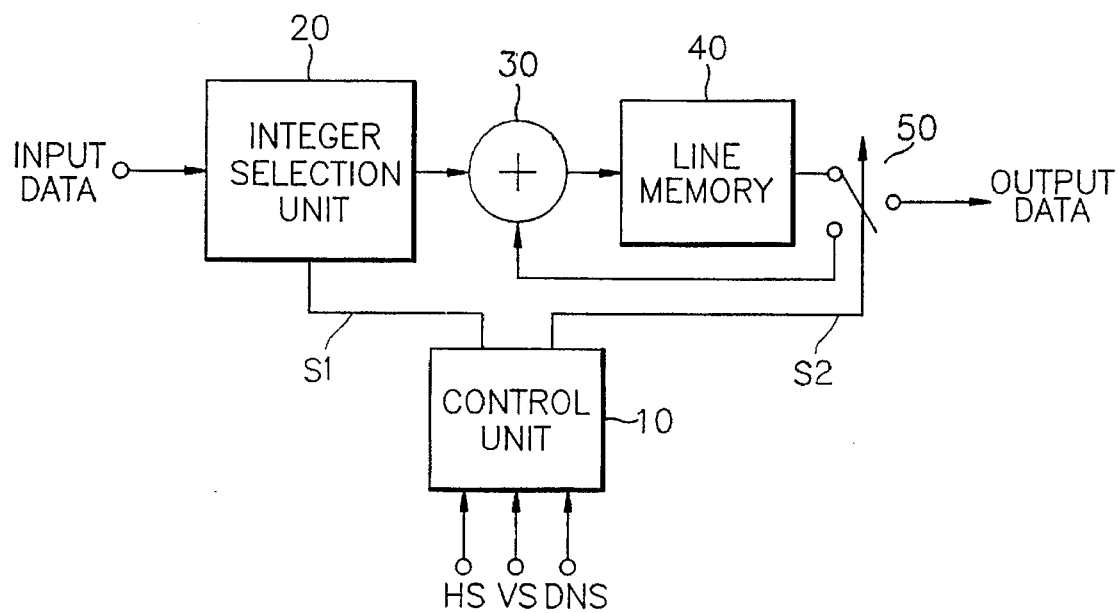
FIG. 1 is a block diagram illustrating a configuration of a vertical filter circuit of a PIP display device of a television set according to the present invention.

FIG. 1 is a block diagram illustrating a configuration of a vertical filter circuit of a PIP display device of a television set according to the present invention. A control unit 10 receives a horizontal sync signal HS, a vertical sync signal VS and a mode signal DNS. The control unit 10 recognizes a designated mode by means of the mode signal DNS, counts the horizontal sync signal HS according to the designated mode during a period established by the vertical sync signal VS, and generates a first control signal S1 for selecting an attenuation coefficient and a second control signal S2 for selecting the number of horizontal lines to be averaged. The integer selection unit 20 receives image data, and also receives the first control signal S1 of the control unit 10 as a selection signal for selecting the attenuation coefficient. The integer selection unit 20 attenuates the image data to be received with the attenuation coefficient selected by the first control signal S1 and then outputs the image data. An adding unit 30 is connected to an output terminal of the integer selection unit 20 at a first input terminal thereof, and is connected to a second output terminal of a switching unit 50 at a second input terminal thereof. The adding unit 30 adds image data of an attenuated current horizontal line output from the integer selection unit 20 to an averaged image data attenuated up to a previous horizontal line output from the switching unit 50, and then outputs the added image data. A line memory 40, which stores image data of one horizontal line, receives and stores the added image data output from the adding unit 30. The image data stored in the line memory 40 corresponds to the image data up to horizontal line received currently which is attenuated, added and averaged.

The switching unit 50 receives the image data output from the line memory 40 and also receives the second control signal S2 output from the control unit 10. The switching unit 50 is also connected to the second input terminal of the adding unit 30 at the second output terminal thereof and is connected to a signal process input terminal of the PIP display device (not shown) at a first terminal thereof. The switching unit 50 outputs the image data output from the line memory 40 to the second input terminal of the adding unit 30 or to the signal process input terminal of the PIP display device responsive to the second control signal S2 applied to the switching unit 50.

Figure 2:
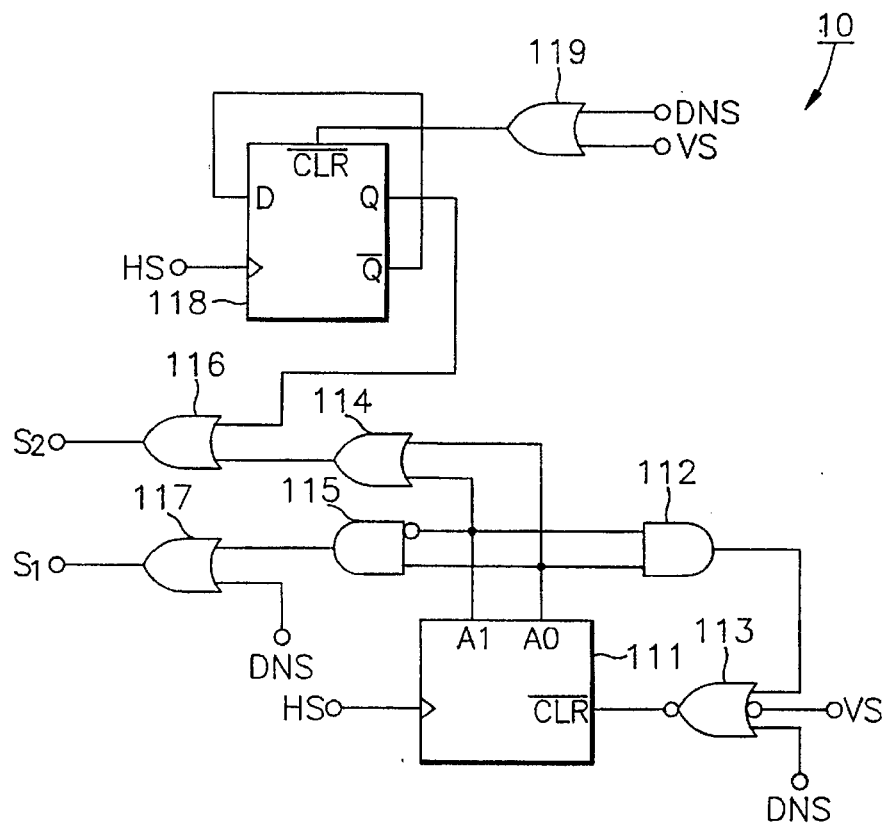
FIG. 2 is a detailed circuit diagram illustrating a configuration of the control unit 10 of FIG. 1.

FIG. 2 is a detailed circuit diagram illustrating a configuration of the control unit 10 of FIG. 1, wherein the first and second control signals S1 and S2 of the normal scan mode, and the first and second control signal S1 and S2 of the double scan mode are generated in accordance with the mode signal DNS. FIG. 2 is configured based on the following assumptions. When the vertical filter circuit is in the normal scan mode, the control unit 10 averages image data of three horizontal lines to form image data of one horizontal line. When the vertical filter circuit is in the double scan mode, the control unit 10 averages image data of two horizontal lines to form data of one horizontal line.

In FIG. 2, a first count unit includes a counter 111, an AND gate 112 and a NOR gate 113. The first count unit, which receives the horizontal sync signal HS, the vertical sync signal VS and the mode signal DNS, is disabled upon reception of the double scan mode signal DNS and enabled upon reception of the normal mode signal DNS. The first count unit counts the horizontal sync signal HS over the period of the vertical sync signal VS, generates first to fourth dividing signals and is cleared upon generation of the fourth dividing signal. A second count unit includes a flip-flop 118 and an OR gate 119. The second count unit, which receives the mode signal DNS and the horizontal sync signal HS, is disabled upon reception of the normal mode signal DNS and enabled upon reception of the double mode signal DNS. Then, the second count unit divides and outputs the horizontal sync signal HS.

A first control signal S1 generating unit advantageously includes an OR gate 117 and an AND gate 115. In the normal scan mode, the mode signal DNS is a logic "low" level signal, while in the double scan mode, the mode signal DNS is a logic "high" level signal. When the normal scan mode is executed by the normal scan mode signal DNS in the logic "low" level, the flip-flop 118 is cleared and the counter 111 is in a preparation state for operation. In the double scan mode, the first control signal S1 generating unit receives the mode signal DNS having the logic "high" level and an output of the first count unit, and the AND gate 115 logically combines the first to third dividing signals output from the first counter unit, generates the first control signal S1 of the logic "low" level for selecting a second attenuation coefficient during the period of the first and third dividing signals, and generates the first control signal S1 of the logic "high" level for selecting a first attenuation coefficient during the period of the second dividing signal. The first control signal S1 for selecting the first and second attenuation coefficients is output to the integer selection unit 20. In the double scan mode, the counter 111 is cleared by the mode signal DNS having the logic "high" level. The OR gate 117 outputs a signal of a logic "high" level, which is output to the first control signal S1. Hence, in the double scan mode, the first control signal S1 selects the first attenuation coefficient.

A second control signal S2 generating unit preferably includes OR gates 114 and 116. When the normal scan mode is executed by the normal scan mode signal DNS in the logic "low" level, the flip-flop 118 is cleared and the counter 111 is in preparation state for operation. In the normal scan mode, the OR gate 116 outputs the second control signal S2 by the output of the OR gate 114 due to the cleared state of the flip-flop 118. The OR gate 114 logically combines the first to third dividing signals output from the counter 111, generates the second control signal S2 of the logic "low" level for switching-outputting a compressed image data averaged during the period of the first dividing signal, and generates the second control signal S2 of the logic "high" level, for performing attenuating, adding and averaging operations for image data received during the period of the second and third dividing signals. In the double scan mode, the counter 111 is cleared by the mode signal DNS having the logic "high" level and the flip-flop 118 is in a preparation. The OR gate 116 generates, irrespective of the output of the OR gate 114, the second control signal S2 of the logic "low" level for switching-outputting the compressed data averaged by the output of the flip-flop 118.

Figure 3:
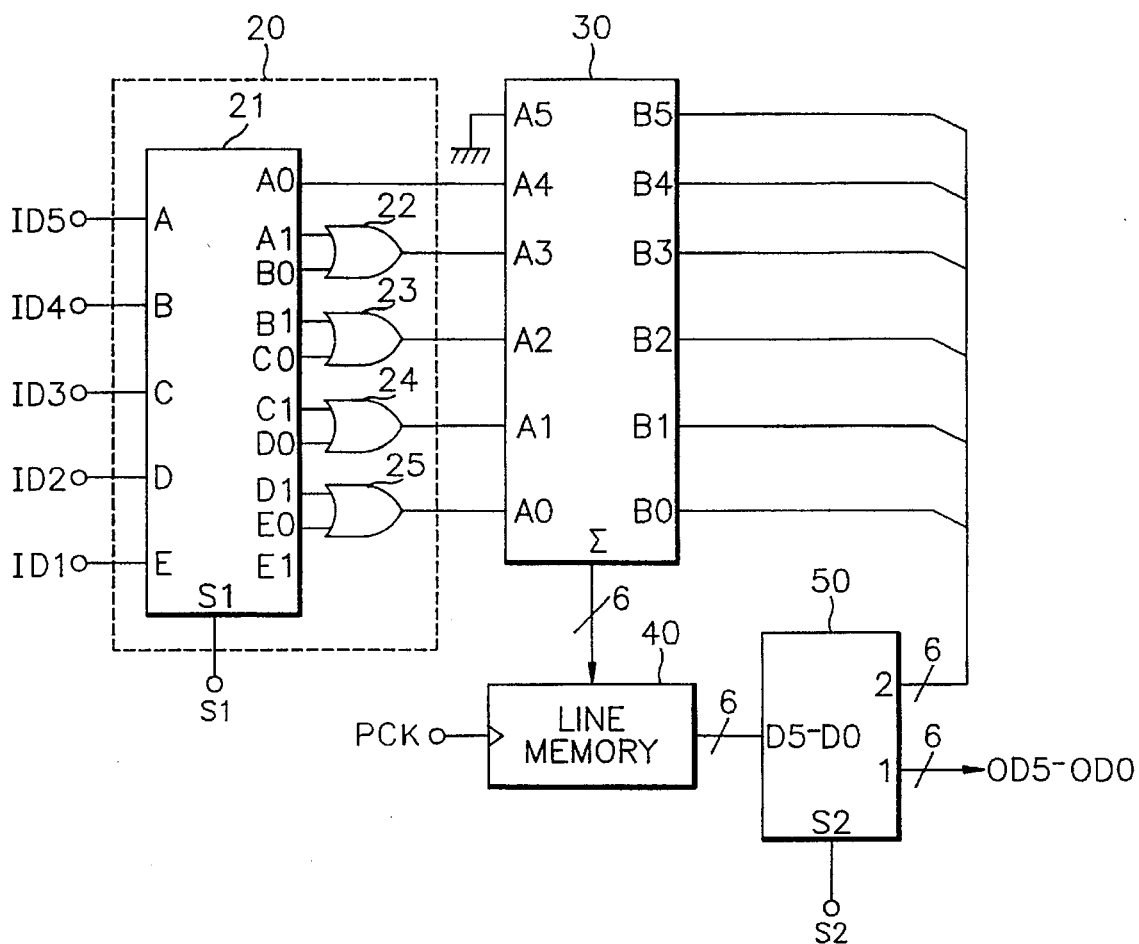
FIG. 3 is a detailed circuit diagram illustrating a configuration of the remaining components, except for the control unit 10, of FIG. 1.

FIG. 3 is a detailed circuit diagram illustrating a configuration of the remaining components of FIG. 1, except for the control unit 10. In this exemplary configuration, it is assumed that image data consists of 6 bits and that, in the first attenuation operation, the image data is attenuated to half, while, in the second attenuation operation, the image data is attenuated to one fourth.

The integer selection unit 20 includes, in an exemplary case, a demultiplexer 21 and OR gates 22–25. The demultiplexer 21 includes input terminals A to E for receiving the image data of 6 bits, first output terminals A0 to E0 for performing the first attenuation by eliminating the least significant bit of the received image data, and second output terminals A1 to D1 for performing the second attenuation by eliminating two least significant bits of the received image data. The OR gate 22 logically ORs the outputs of the output terminals A1 and B0 and then outputs the logically ORed result, and the OR gate 23 logically ORs the outputs of the output terminals B1 and C0 and then outputs the logically ORed result. The OR gate 24 logically ORs the outputs of the output terminals C1 and D0 and then outputs the logically ORed result, and the OR gate 25 logically ORs the outputs of the output terminals D1 and E0 and then outputs the logically ORed result. Hence, the demultiplexer 21 selects the outputs of the first output terminals A0 to E0, upon reception of the first control signal S1 having the logic "high" level, and selects and outputs first attenuation image data obtained by eliminating the least significant bit of the image data received. Moreover, the demultiplexer 21 selects the outputs of the second output terminals A1 to D1, upon reception of the first control signal S1 having the logic "low" level, and selects and outputs second attenuation image data obtained by eliminating the two least significant bits of the image data received.

It will be appreciated that demultiplexer 21 serves to attenuate input data ID5–ID0 having 6 bits to one-half of the original size thereof. Here, the least significant bit ID0 is not connected, and thus not supplied, with input terminals of the demultiplexer 21 and only the input data ID5–ID1 are connected therewith. In other words, demultiplexer 21, which cannot select the least significant bit ID0, attenuates the image data. Furthermore, demultiplexer 21 serves to selectively output the generated data ID5–ID0 as data having either 5 bits or 4 bits responsive to the first control signal S1. Therefore, it will be noted that while demultiplexer 21 can be illustrated as having inputs ID5–ID0, corresponding to inputs A–F, respectively, since the least significant bit on line ID0 is not applied to demultiplexer 21, that line and the input labeled F are omitted from FIG. 3.

The adding unit 30 includes first input terminals A5 to A0 and second input terminals B5 to B0. In the first input terminals A5 to A0, the most significant bit A5 is connected to ground potential and the least significant bits A3 to A0 are each connected to the output terminals of the OR gates 22 to 25. The second input terminals B5 to B0 are each connected to a second output terminal of the switching unit 50. The adding unit 30 adds the attenuated image data output from the integer selection unit 20 and image data averaged up to now, and outputs the added image data.

The line memory 40 receives the image data from the adding unit 30 and stores the image data by a pixel clock PCK. The line memory 40 is established to have a size capable of storing image data of one horizontal line.

The switching unit 50 is composed of a demultiplexer which is connected to the output terminal of the line memory 40 at the input terminals D5–D0 thereof, to the second input terminals B5 to B0 of the adding unit 30 at the second output terminal thereof, and to image data output terminals OD5 to OD0 at a first output terminal thereof. The switching unit 50 outputs, when the second control signal S2 is in the logic "high" level, the output of the line memory 40 to the second output terminals B5 to B0 of the adding unit 30. On the other hand, the switching unit 50 is switched and outputs, when the second control signal S2 is in the logic "low" level, the averaged image data stored in the line memory 40 to the image data output terminals OD5 to OD0.

FIGS. 4A–4D are waveform diagrams illustrating operations of each component of the vertical filter circuit in a normal scan mode according to the present invention. The horizontal sync signal HS is generated like a waveform 411 of FIG. 4A and the mode signal DNS is received as a signal of the logic "low" level. At this time, when the mode signal DNS of the logic "low" level is received, the flip-flop 118 is cleared and the counter 111 is in the preparation state for operation. Then, the counter 111 counts the horizontal sync signal HS as shown in 411 of FIG. 4A and generates the first to fourth dividing signals. It will be accordingly appreciated that the first to fourth dividing signals are in accordance with the period of the horizontal sync signal HS. The AND gate 112 logically ANDs the output of the counter 111 and outputs the logically ANDed outputs to the NOR gate 113. The NOR gate 113 complementarily ORs the mode signal DNS, a complementary horizontal sync signal HS and the output of the AND gate 112 and applies the complementarily ORed results as a clear signal of the counter 111. The NOR gate 113 allows the counter 111 to be cleared, if the vertical sync signal VS has a logic "low" level or the AND gate 112 outputs a signal having the logic "high" level. Then, the counter 111 sequentially counts the horizontal sync signal HS by three signals by the period of the vertical sync signal VS. As a result, in the normal scan mode, image data of three horizontal lines is averaged into image data of one horizontal line.

First, in a process of generating the first control signal S1, the AND gate 115 receives a first output of the counter 111 and inversely-receives a second output thereof. Then, the AND gate 115 logically ANDs the outputs of the counter 111, and outputs a logic "low" signal responsive to the first (A1=low, and A0=low) and third (A1=low, and A0=high) dividing signals, and a logic "high" signal to the second (A1=high, and A0=low) dividing signal, as shown in 413 of FIG. 4C. At this time, the mode signal DNS outputs the signal of the logic "low" level, so that the OR gate 117 outputs the output of the AND gate 115 without any change. Accordingly, the first control signal S1 is generated as a signal of the logic "low" level at the periods of the first and third horizontal lines and as a signal of the logic "high" level at the period of the second horizontal line, as shown in 413 of FIG. 4C.

Second, in a process of generating the second control signal S2, the OR gate 114 logically ORs the first to third dividing signals of the counter 111 and outputs the logically ORed result. Then, the OR gate 116 logically ORs the outputs of the flip-flop 118 and OR gate 114, and outputs the logically ORed result. The output state of the second control signal S2 is shown like a waveform 412 of FIG. 4B. At this time, the flip-flop 118 is cleared, so that the OR gate 116 outputs the output of the OR gate 114 without any change. Accordingly, the second control signal S2 is generated as a signal of the logic "low" level at the period of the first horizontal line and as a signal of the logic "high" level at the periods of the second and third horizontal lines, as shown in 412 of FIG. 4B.

In case of receiving image data of the first horizontal line in the normal scan mode where the first and second control signals S1 and S2 are generated, the first and second control signals S1 and S2 are generated as signals having the logic "low" levels. As shown in 412 of FIG. 4B, in the case that the second control signal S2 is generated as the signal having the logic "low" level, the switching unit 50 switching-outputs the image data output from the line memory 40 to the first output terminal thereof. Accordingly, the switching unit 50 outputs the averaged image data stored up to the reception of the image data of the first horizontal line.

Furthermore, when the image data of the first horizontal line is received, the first control signal S1 is generated as the signal having the logic "low" level, as shown in 413 of FIG. 4C. The demultiplexer 21 selects and outputs the image data received to the second output terminals A1 to D1. Then, the two least significant bits of the image data received are eliminated and the second attenuation for the image data is made to pare the image data down to one fourth its original size, as shown in 414 of FIG. 4D, thereby applying the attenuated image data to the first input terminals A4 to A0 of the adding unit 30. The adding unit 30 adds the outputs of the first input terminals A5 to A0 and the second input terminals B5 to B0. It will be appreciated that the adding unit 30 does not have the second input since the switching unit 50 is switched to the first output terminal. Therefore, the adding unit 30 outputs, without having the second input, the attenuated image data of the first horizontal line output from the integer selection unit 20 to the line memory 40. At this time, the line memory 40 shift-outputs the averaged image data stored up to this point responsive to the pixel clock PCK to the switching unit 50 and simultaneously stores the attenuated image data of the first horizontal line received from the adding unit 30. The operations described above are repeatedly performed until the attenuation operation of image data of the first horizontal line is completed.

Thereafter, when the image data of the second horizonal line is received, the second control signal S2 is generated as the signal having the logic "high" level, as shown in 412 of FIG. 4B. The switching unit 50 is switched to the second output terminals by the second control signal S2 of the logic "high" level and connects the output of the line memory 40 to the second input terminals B5 to B0 of the adding unit 30 using switching unit 50.

When the image data of the second horizonal line is received, the first control signal S1 is generated as the signal having the logic "high" level, as shown in 413 of FIG. 4C. The demultiplexer 21 selects and outputs the image data received to the first output terminals A0 to E0. Then the least significant bit of the image data received is eliminated and the second attenuation for the image data is made to pare the image data down to one half its original size, as shown in 414 of FIG. 4D, thereby applying the attenuated image data to the first input terminals A4 to A0 of the adding unit 30. The adding unit 30 adds the outputs of the first input terminals A5 to A0 and the second input terminals B5 to B0. The second input of the adding unit 30 is the image data of the first horizontal line output from the line memory 40 since the switching unit 50 is switched to the second output terminal. It will be appreciated that the image data of the first horizontal line is attenuated to have one fourth its previous size. Therefore, the adding unit 30 adds the first attenuated image data of the second horizontal line output from the integer selection unit 20 and the image data of the first horizontal line before the performance of the second attenuation operation and outputs the added result to the line memory 40. At this time, the line memory 40 shift-outputs the averaged image data stored up to this point by the pixel clock PCK to the switching unit 50 and simultaneously stores the attenuated image data of the second horizontal line received from the adding unit 30. The operations described above are repeatedly performed until the attenuation operation of image data of the second horizontal line is completed.

Finally, when the image data of the third horizonal line is received, the second control signal S2 is generated as the signal having the logic "high" level, as shown in 412 of FIG. 4B. The switching unit 50 is switched to the second output terminal and connects the output of the line memory 40 to the second input terminals B5 to B0 of the adding unit 30.

When image data of the third horizontal line is received, the first control signal S1 is generated as the signal having the logic "low" level, as shown in 413 of FIG. 4C. The demultiplexer 21 selects and outputs the image data received to the second output terminals A1 to D1. Then the two least significant bits of the image data received are eliminated and the second attenuation for the image data is made to pare the image data down to one fourth its original size, thereby applying the attenuated image data to the first input terminals A4 to A0 of the adding unit 30. The adding unit 30 adds the outputs of the first input terminals A5 to A0 and the second input terminals B5 to B0. The second input of the adding unit 30 is the image data of the second horizontal line output from the line memory 40 since the switching unit 50 is switched to the second output terminal. Therefore, as shown in 414 of FIG. 4D, the adding unit 30 adds the second attenuated image data of the third horizontal line output from the integer selection unit 20 and the averaged image data corresponding to the second horizontal line and outputs the added result to the line memory 40. At this time, the line memory 40 shift-outputs the averaged image data stored up to this point by the pixel clock PCK to the switching unit 50 and simultaneously stores the attenuated image data of the third horizontal line received from the adding unit 30. The operations described above are repeatedly performed until the attenuation operation of image data of the third horizontal line is completed.

Accordingly, while the operations as mentioned above are repeated in the normal scan mode, the image data of three horizontal lines are attenuated by each of the established attenuation coefficients and then added, thus to be averaged to the image data of one horizontal line. It will be appreciated that the image data of three horizontal lines are compressed into the image data of one horizontal line and the compressed image data is then output. Upon performance of the attenuation operation, the attenuation coefficient of the image data of the second horizontal line placed in a center position is ½, and each of the attenuation coefficients of the image data of the first and third horizontal lines are each ¼. Since the total sum of the attenuation coefficients is 1, an effective attenuation operation can be embodied. In addition, by reducing the degree of attenuation of the image data of the center horizontal line, the image data can be compressed in a stable state.

FIGS. 5A–5D are waveform diagrams illustrating operations of each component of the vertical filter circuit in a double scan mode of operation according to the present invention. The horizontal sync signal HS 511 is generated like a waveform 411 of FIG. 4A and the mode signal DNS is received as a signal of the logic "high" level. At this time, when the mode signal DNS of the logic "high" level is received, the flip-flop 118 is in the preparation state for operation and the counter 111 is cleared. The OR gate 117 generates the first control signal having the logic "high" level, as shown in 513 of FIG. 5C, by the mode signal DNS of the logic "high" level. Accordingly, it will be appreciated that only the first attenuation coefficient is selected in the double scan mode. Preferably, the flip-flop 118 two-divides the horizontal sync signal HS and outputs the divided signal, as shown in 512 of FIG. 5B. The OR gate 116 receiving the output of the flip-flop 118, outputs a signal such as that shown in 512 of FIG. 5B, as the second control signal S2.

In case of receiving image data of the first horizontal line, since the second control signal S2 is generated as the signal having the logic "low" level, as shown in 512 of FIG. 5B, the switching unit 50 switching-outputs the image data output from the line memory 40 to the first output terminal. Accordingly, the switching unit 50 outputs the averaged image data stored up to the reception of the image data of the first horizontal line.

Furthermore, when the image data of the first horizonal line is received, the first control signal S1 is generated as the signal having the logic "high" level, as shown in 513 of FIG. 5C. The demultiplexer 21 selects and outputs the image data received to the first output terminals A0 to E0. Then the least significant bit of the image data received is eliminated and the first attenuation for the image data is made to pare the image data down to one half its original size, as shown in 514 of FIG. 5D, thereby applying the attenuated image data to the first input terminals A4 to A0 of the adding unit 30. The adding unit 30 adds the outputs of the first input terminals A5 to A0 and the second input terminals B5 to B0. It will be appreciated that the adding unit 30 does not receive the second input since the switching unit 50 is switched to the first output terminals. Therefore, the adding unit 30 directly outputs, without benefit of the second input, the attenuated image data of the first horizontal line output from the integer selection unit 20 to the line memory 40. At this time, the line memory 40 shift-outputs the averaged image data stored up to this point responsive to the pixel clock PCK to the switching unit 50 and simultaneously stores the attenuated image data of the first horizontal line received from the adding unit 30. The operations described above are repeatedly performed until the attenuation operation of image data of the first horizontal line is completed.

Thereafter, when the image data of the second horizonal line is received, the second control signal S2 is generated as the signal having the logic "high" level, as shown in 512 of FIG. 5B. The switching unit 50 is switched to the second output terminals, connecting the output of the line memory 40 to the second input terminals B5 to B0 of the adding unit 30.

When the image data of the second horizontal line is received, the first control signal S1 is generated at a logic "high" level, as shown in 513 of FIG. 5C. The demultiplexer 21 selects and outputs the image data received to the first output terminals A0 to E0. Then the least significant bit of the image data received is eliminated and the second attenuation for the image data is made to have half of its previous size, thereby applying the attenuated image data to the first input terminals A4 to A0 of the adding unit 30. The adding unit 30 adds the outputs of the first input terminals A5 to A0 and the second input terminals B5 to B0. The second input of the adding unit 30 is the image data of the first horizontal line output from the line memory 40, since the switching unit 50 is switched to its second output terminal. Therefore, the adding unit 30 adds the first attenuated image data of the second horizontal line output from the integer selection unit 20 and the image data of the first horizontal line after the performance of the second attenuation operation and outputs the added result to the line memory. 40. At this time, the line memory 40 shift-outputs the averaged image data stored up to this point, in time to the pixel clock PCK, to the switching unit 50 and simultaneously stores the attenuated image data of the second horizontal line received from the adding unit 30. The operations described above are repeatedly performed until the attenuation operation of image data of the second horizontal line is completed.

Accordingly, while the operations mentioned above are repeated in the double scan mode, the image data of two horizontal lines are attenuated by each of the established attenuation coefficients and then added, to thus form the average of the image data for one horizontal line. It will be appreciated that this reduces the number of compressed horizontal lines applied to display via the PIP circuit, since the number of scanning lines of main picture in the double scan mode is twice the number of lines in the normal scan mode.

As previously discussed, a vertical filter circuit and method of PIP display device of a television set according to the present invention can select an appropriate attenuation coefficient in accordance with normal scan mode and double scan mode and determine its output. In addition, performance of the vertical filtering function can be accomplished by filter having a simple construction.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A vertical filter circuit of a picture in picture (PIP) display device of a television set, said vertical filter circuit comprising:

control means receiving a horizontal sync signal and a mode signal, for generating a first control signal for selecting an attenuation coefficient by dividing said horizontal sync signal and based on said mode signal, and for generating a second control signal for compressing a predetermined number of horizontal lines, wherein said first and second control signals are generated based on said horizontal sync signal and said mode signal, wherein said mode signal indicates a normal scan mode and a double scan mode;

attenuating means, receiving image data, for attenuating said image data with the selected attenuation coefficient determined by said first control signal and for outputting the attenuated image signal;

adding means, having first input terminals connected to output terminals of said attenuating means, for adding and averaging the attenuated image data received at said first input terminals and stored image data provided to second input terminals of said adding means;

line memory means connected to output terminals of said adding means, for storing said attenuated image data as said stored image data corresponding to a horizontal line; and switching means having respective input terminals connected to output terminals of said line memory, first output terminals for output of said stored image data, and second output terminals connected to said second input terminal of said adding means, for switching between said first and said second output terminals of said switching means responsive to said second control signal, thereby attenuating said image data received during a horizontal line period with said selected attenuation coefficient determined by said first control signal, and thereby compressing said image data averaged by said predetermined number of horizontal lines responsive to said second control signal and outputting the compressed image data, wherein said predetermined number of horizontal lines is based on said mode signal.

2. The vertical filter circuit as defined in claim 1, wherein said attenuating means is a demultiplexer having first and second output terminal groups that permit elimination of least significant bits of said image data, and input terminals receiving said image data, wherein said first and second output terminal groups are connected to said first input terminals of said adding means, wherein said image data is attenuated by selecting one of said first and second output terminal groups responsive to said first control signal.

3. The vertical filter circuit as defined in claim 2, wherein said switching means is a demultiplexer having said input terminals connected to said output terminals of said line memory and said first and said second output terminals, whereby contents of said line memory are output to said second output terminals and, upon reception of said second control signal, said demultiplexer is switched to output said contents to said first output terminals.

4. The vertical filter circuit as defined in claim 1, wherein said predetermined number of horizontal lines are compressed by ratios of 3:1 and 2:1 when said mode signal indicates the normal scan mode and the double scan mode, respectively.

5. A vertical filter circuit of a picture in picture (PIP) display device of a television set, for horizontally compressing image data to be received at a ratio of one of 2:1 and 3:1, said vertical filter circuit comprising:

control means for receiving a horizontal sync signal and a mode signal, for generating a first control signal for selecting between first and second attenuation coefficients by dividing said horizontal sync signal and based on said mode signal, and for generating a second control signal for compressing horizontal lines at the ratio of one of 2:1 and 3:1 based on said mode signal, wherein said mode signal indicates a normal scan mode and a double scan mode;

attenuating means having said first and second attenuation coefficients, for attenuating and outputting said image data by selecting one of said first and second attenuation coefficients corresponding to said first control signal, thereby producing attenuated image data;

adding means, having a first input terminal connected to an output terminal of said attenuating means, for adding and averaging said attenuated image data received at said first input terminal to stored image data received at a second input terminal of said adding means;

line memory means connected to an output terminal of said adding means, for storing the added image data corresponding to one of said horizontal lines to thereby produce said stored image data; and switching means having an input terminal connected to an output terminal of said line memory means, a first output terminal for output of said stored image data, and a second output terminal connected to said second input terminal of said adding means, whereby said switching means is switched and outputs said stored image data responsive to said second control signal, wherein said first and said second attenuation coefficients are selected by said first control signal, wherein said image data is attenuated during a period corresponding to one of said horizontal lines using the selected one of said first and said second attenuation coefficients, and wherein said image data is averaged by three horizontal lines when said mode signal indicates the normal scan mode, and by two horizontal lines when said mode signal indicates the double scan mode, compressed and output responsive to said second control signal.

6. The vertical filter circuit as defined in claim 5, wherein said control means comprises:

means for counting said horizontal sync signal and for generating first to fourth dividing signals, said counting means being cleared by said fourth dividing signal;

first means for logically compounding said first to third dividing signals when said mode signal indicates said normal scan mode, thereby generating said first control signal for selecting said second attenuation coefficient during periods corresponding to said first and third dividing signals, and generating said first control signal for selecting said first attenuation coefficient during a period corresponding to said second dividing signal, and generating said first control signal for selecting said second attenuation coefficient when said mode signal indicates said double scan mode; and second means for logically compounding said first to third dividing signals, for generating said second control signal for switching-outputting a compressed image data averaged during the period of said first dividing signal.

7. The vertical filter circuit as defined in claim 5, wherein said attenuating means comprises:

first output terminal means for performing a first attenuation operation by eliminating a least significant bit of said image data; and second output terminal means for performing a second attenuation operation by eliminating two least significant bits of said image data, wherein said attenuating means further comprises:

a demultiplexer in which one of said first and said second output terminal means is selected by said first control signal and said image data is output by performance of a respective one of said first and second attenuation operations.

8. The vertical filter circuit as defined in claim 5, wherein said switching means comprises a demultiplexer.

9. A vertical filter circuit of a picture in picture (PIP) display device of a television set having normal and double scan modes, said vertical filter circuit comprising:

control means receiving normal and double mode signals and a horizontal sync signal, for generating a first control signal for selecting between first and second attenuation coefficients in a designated mode by dividing said horizontal sync signal in accordance with said normal and double mode signals, and for generating a second control signal for compressing a predetermined number of horizontal lines;

attenuating means receiving image data, for attenuating said image data responsive to the selected one of said attenuation coefficients determined by said first control signal and for outputting the attenuated image data;

adding means having a first input terminal connected to an output terminal of said attenuating means, for adding and averaging said attenuated image data to stored image data provided to said adding means;

line memory means connected to an output terminal of said adding means, for storing said attenuated image data corresponding in size to a horizontal line to thereby produce said stored image data; and switching means having an input terminal connected to an output terminal of said line memory, a first output terminal for output of said stored image data, and a second output terminal connected to said adding means, whereby said switching means is switched and outputs said stored image data of the designated mode by said second control signal, thereby selecting said attenuation coefficient of the designated mode by said first control signal, attenuating said image data received by a period of the horizontal line with the selected attenuation coefficient, compressing said image data averaged by a predetermined number of horizontal lines in the designated mode by said second control signal, and outputting the compressed image data.

10. The vertical filter circuit as defined in claim 9, wherein said control means comprises:

first count means receiving said normal and said double mode signals and a horizontal sync signal for generating first to fourth dividing signals by counting said horizontal sync signal, said first count means being disabled upon reception of said double mode signal and enabled upon reception of said normal mode signal and being cleared in response to said fourth dividing signal;

second count means receiving said normal and said double mode signals and said horizontal sync signal, being disabled upon reception of said normal mode signal and enabled upon reception of said double mode signal, for dividing said horizontal sync signal by two;

means for receiving said normal and said double mode signals and an output of said first count means, for generating, in said normal scan mode, said first control signal for selecting a second attenuation coefficient during periods of first to third dividing signals by logically compounding said first to third dividing signals output from said first count means and for selecting a first attenuation coefficient during a period of said second dividing signal, and, in said double scan mode, said first control signal for selecting said first attenuation coefficient responsive to said double mode signal; and means for receiving outputs of said first count means and said second count means, for generating, in said normal scan mode, said second control signal for switching-outputting a compressed data averaged during the period of said first dividing signal by logically compounding said first to third dividing signals, and for generating, in said double scan mode, said second control signal for switching-outputting said compressed data averaged by the output of said second count means.

11. The vertical filter circuit as defined in claim 10, wherein said attenuating means comprises:

first output terminal means for performing a first attenuation operation by eliminating one least significant bit of said image data; and second output terminal means for performing a second attenuation operation by eliminating two least significant bits of said image data:

wherein said attenuating means comprises a first demultiplexer in which one of said first and said second output terminal means is selected by said first control signal and said image data is output by performance of a respective one of said first and said second attenuation operations.

12. The vertical filter circuit as defined in claim 11, wherein said switching means comprises a second demultiplexer having an input terminal connected to an output terminal of said line memory, a first output terminal connected to output said stored image data, and a second output terminal connected to said second input terminal of said adding means, by which said stored image data of said line memory is output to said second output terminal, so as to permit said stored image data, averaged over two horizontal lines when said double mode signal is received and over three horizontal lines when said normal mode signal is received and stored in said line memory, is output to said first output terminal, whereby said switching means is switched upon reception of said second control signal.

13. A vertical filtering method for compressing image data of one of M and N horizontal lines into image data of one horizontal line, said method comprising the steps of:

receiving one of first and second scan mode signals;

upon reception of said image data of a first horizontal line, attenuating said image data of said first horizontal line by a first predetermined attenuation coefficient and storing the attenuated image data;

upon reception of said image data of a second horizontal line, attenuating said image data of said second horizontal line by a second predetermined attenuation coefficient, adding the attenuated image data and image data stored up to a previous horizontal line, averaging the added image data, and storing the averaged image data;

repeating said steps when image data for third and M−1 horizontal lines are received when said first scan mode signal is received, and when image data for third and N−1 horizontal lines are received when said second mode scan signal is received; and upon reception of image data for an M horizontal line when said first scan mode signal is received and an N horizontal line when said second scan mode signal is received, attenuating said image data of one of said M and N horizontal lines by one of the first and second predetermined attenuation coefficients based on the mode signals, adding the attenuated image data and image data stored up to a previous horizontal line.

14. A vertical filter method of a picture in picture (PIP) display device of a television set having normal and double scan modes, said vertical filter method comprising the steps of:

receiving one of normal and double scan mode signals, and entering a normal scan mode and a double scan mode, respectively;

wherein when in said normal scan mode:

(a) attenuating, upon reception of said image data of a first horizontal line, said image data of said first horizontal line by a predetermined attenuation coefficient;

(b) attenuating, upon reception of said image data of a second horizontal line, said image data of said second horizontal line by the predetermined attenuation coefficient, to thereby add and store the attenuated image data and respective image data stored up to a previous horizontal line; and (c) attenuating, upon reception of said image data of a third horizontal line, said image data of said third horizontal line by the predetermined attenuation coefficient, to thereby add and output the attenuated image data and respective image data stored up to a previous horizontal line, wherein said steps (a) through (c) are repeatedly performed; and when in said double scan mode:

(d) attenuating, upon reception of said image data of said first horizontal line, said image data of said first horizontal line by another predetermined attenuation coefficient; and (e) attenuating, upon reception of said image data of said second horizontal line, said image data of said second horizontal line by the other predetermined attenuation coefficient, to thereby add and output the attenuated image data and image data stored up to the previous horizontal line, wherein said steps (d) and (e) are repeatedly performed.

* * * * *